(12) United States Patent
Kang et al.

(10) Patent No.: US 11,921,691 B2
(45) Date of Patent: Mar. 5, 2024

(54) LOW LATENCY DEMULTIPLEXER FOR PROPAGATING ORDERED DATA TO MULTIPLE SINKS

(71) Applicant: Google LLC, Mountain View, CA (US)

(72) Inventors: Han Samuel Kang, Santa Clara, CA (US); Mateusz Szymon Matejczyk, Warsaw (PL); Justin Santa Barbara, Atlanta, GA (US); Daniel Veritas Smith, Reno, NV (US); Wojciech Tyczynski, Mountain View, CA (US); Wenjia Zhang, Mountain View, CA (US); Joe Betz, Mountain View, CA (US)

(73) Assignee: Google LLC, Mountain View, CA (US)

( * ) Notice: Subject to any disclaimer, the term of this patent is extended or adjusted under 35 U.S.C. 154(b) by 14 days.

(21) Appl. No.: 17/807,820

(22) Filed: Jun. 20, 2022

(65) Prior Publication Data
US 2023/0409554 A1    Dec. 21, 2023

(51) Int. Cl.
*G06F 16/23*    (2019.01)
*G06F 16/16*    (2019.01)

(52) U.S. Cl.
CPC .............. *G06F 16/23* (2019.01); *G06F 16/16* (2019.01)

(58) Field of Classification Search
CPC ................................ G06F 16/23; G06F 16/16
See application file for complete search history.

(56) References Cited

U.S. PATENT DOCUMENTS

| | | | |
|---|---|---|---|
| 8,442,962 B2* | 5/2013 | Lee ..................... | G06F 9/466 707/703 |
| 2004/0193820 A1* | 9/2004 | Meiri ................... | G06F 3/0635 711/158 |
| 2008/0256073 A1* | 10/2008 | Detlefs ................. | G06F 9/528 |
| 2014/0279917 A1* | 9/2014 | Minh .................... | G06F 16/13 707/648 |
| 2016/0048703 A1* | 2/2016 | Brandenburger ..... | H04L 63/123 726/26 |
| 2022/0138071 A1* | 5/2022 | Edara ................... | G06F 9/30047 714/42 |

\* cited by examiner

*Primary Examiner* — Hares Jami
(74) *Attorney, Agent, or Firm* — Honigman LLP; Brett A. Krueger

(57) ABSTRACT

A method includes receiving a series of writes that each requests respective data to be stored at a database. For each respective write, the method includes storing the respective data in a first buffer associated with a first data streaming application and a second buffer associated with a second data streaming application. The method includes transmitting the respective data to the database. The method includes receiving, from the database, confirmation that the respective data of the respective write has been committed to the database. The confirmation includes an order indicator indicating an order the respective data of the respective write was committed to the database relative to other writes in the series of writes. In response to receiving the confirmation, the method includes sending the respective data from the first buffer to the first data streaming application and from the second buffer to the second data streaming application.

20 Claims, 7 Drawing Sheets

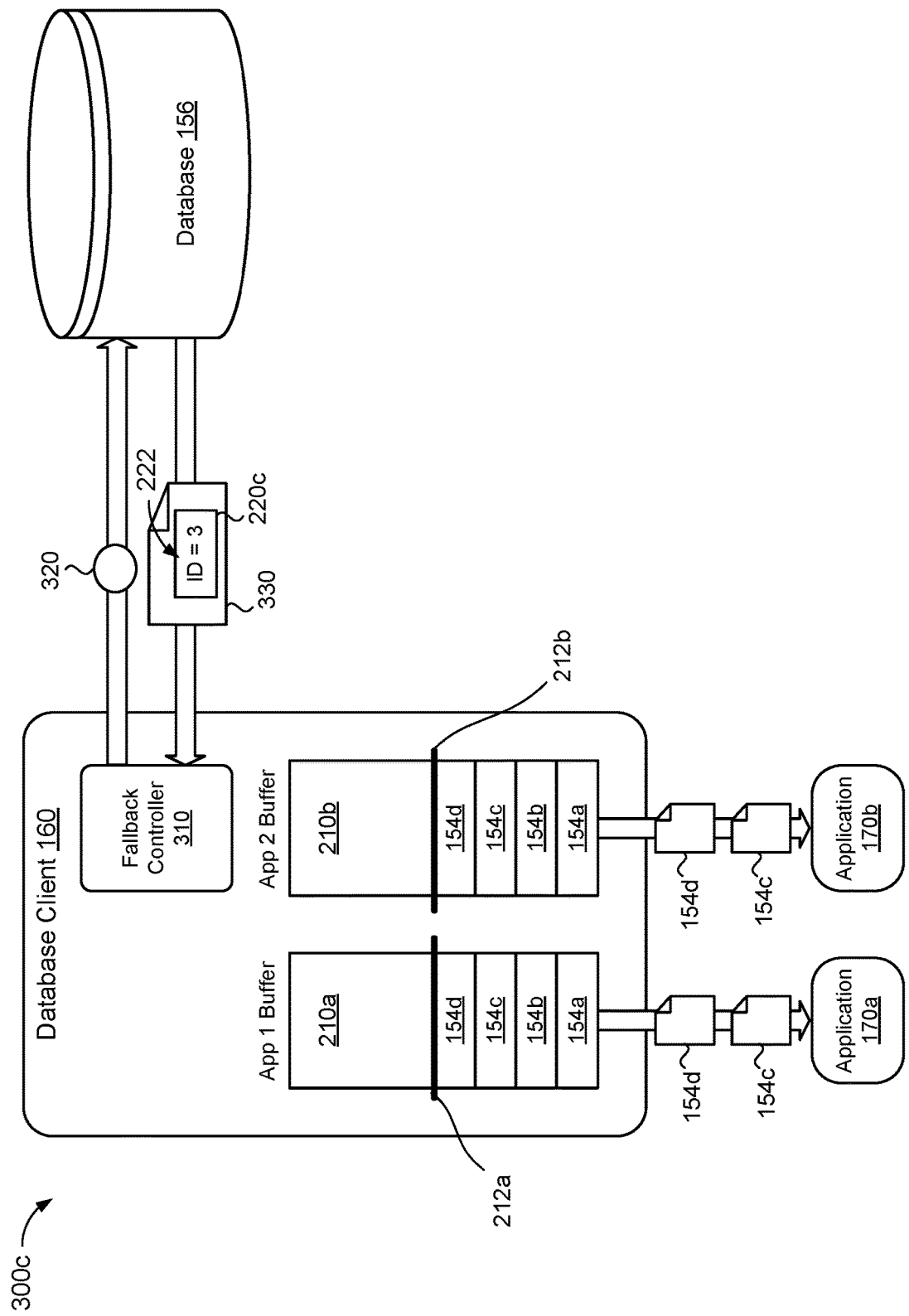

LOW LATENCY DEMULTIPLEXER FOR PROPAGATING ORDERED DATA TO MULTIPLE SINKS

TECHNICAL FIELD

This disclosure relates to low latency demultiplexers for propagating ordered data.

BACKGROUND

As large distributed databases (i.e., "cloud" databases) continue to gain in popularity, demands for propagating data from the databases to data sinks (e.g., applications) also continue to grow. However, continuously propagating ordered data from a database to multiple sinks can be problematic when each sink consumes data at different rates. A naive solution to this problem involves addressing data propagation to each sink individually. However, this requires a separate and independent database query for each stream of data to a given sink. Alternatively, each sink may be limited to the rate of the slowest sink, however this increases the latencies for all sinks except for the slowest sink.

SUMMARY

One aspect of the disclosure provides a method for a low latency demultiplexer that propagates data to multiple sinks. The computer-implemented method, when executed by data processing hardware, causes the data processing hardware to perform operations. The operations include receiving a series of writes. Each write in the series of writes requests respective data to be stored at a database in communication with the data processing hardware. For each respective write in the series of writes, the operations include storing the respective data in a first buffer associated with a first data streaming application, storing the respective data in a second buffer associated with a second data streaming application, and transmitting the respective data to the database. The operations also include receiving, from the database, confirmation that the respective data of the respective write has been committed to the database. The confirmation includes an order indicator indicating an order the respective data of the respective write was committed to the database relative to other writes in the series of writes. In response to receiving the confirmation that the respective data of the respective write has been committed to the database, the operations include sending the respective data of the respective write from the first buffer to the first data streaming application based on the order indicator indicating the respective data was committed to the database relative to other writes in the series of writes and sending the respective data of the respective write from the second buffer to the second data streaming application based on the order indicator indicating the respective data was committed to the database relative to other writes in the series of writes.

Implementations of the disclosure may include one or more of the following optional features. In some implementations, sending the respective data from the first buffer to the first data streaming application based on the order the respective data was committed to the database relative to other writes in the series of writes includes determining, using the order indicator, that confirmation of a preceding write has been received. The respective data of the preceding write was committed to the database immediately before the respective data of the respective write. In some of these implementations, determining that the confirmation of the preceding write has been received includes determining a level of a watermark of the first buffer. Optionally, sending the respective data from the second buffer to the first data streaming application based on the order the respective data was committed to the database relative to other writes in the series of writes includes determining, using the order indicator, that confirmation of a preceding write has not been received, the respective data of the preceding write committed to the database immediately before the respective data of the respective write and, after determining that the confirmation of the preceding write has not been received, receiving the confirmation that the respective data of the preceding write has been committed to the database. The operations may also include, in response to receiving the confirmation that the respective data of the preceding write has been committed to the database, sending the respective data of the preceding write from the second buffer to the second data streaming application and, after sending the respective data of the preceding write, sending the respective data of the respective write from the second buffer to the second data streaming application.

In some examples, the order indicator includes an incrementing identifier. The order indicator, in some implementations, includes a timestamp. In some of these implementations, the operations further include, generating, using the timestamp of each received confirmation, a linked list ordering the series of writes in an order the respective data of each respective write of the series of writes was committed to the database. Generating the linked list may include generating a hashmap.

Optionally, receiving, from the database, the confirmation that the respective data of the respective write has been committed to the database includes determining that a threshold period of time has passed without receiving the confirmation and, in response to determining that the threshold period of time has passed without receiving the confirmation, retrieving a changelog from the database. The operations may also further include determining, from the changelog, that the respective data of the respective write has been committed to the database. The database may include a Structured Query Language (SQL) database.

Another aspect of the disclosure provides a system for a low latency demultiplexer that propagates data to multiple sinks. The system includes data processing hardware and memory hardware in communication with the data processing hardware. The memory hardware stores instructions that when executed on the data processing hardware cause the data processing hardware to perform operations. The operations include receiving a series of writes. Each write in the series of writes requests respective data to be stored at a database in communication with the data processing hardware. For each respective write in the series of writes, the operations include storing the respective data in a first buffer associated with a first data streaming application, storing the respective data in a second buffer associated with a second data streaming application, and transmitting the respective data to the database. The operations also include receiving, from the database, confirmation that the respective data of the respective write has been committed to the database. The confirmation includes an order indicator indicating an order the respective data of the respective write was committed to the database relative to other writes in the series of writes. In response to receiving the confirmation that the respective data of the respective write has been committed to the database, the operations include sending the respective data of the respective write from the first buffer to the first data streaming application based on the order indicator indicating the respective data was committed to the database relative to other writes in the series of writes and sending the respective data of the respective write from the second buffer to the second data streaming application based on the order indicator indicating the respective data was committed to the database relative to other writes in the series of writes.

This aspect may include one or more of the following optional features. In some implementations, sending the respective data from the first buffer to the first data streaming application based on the order the respective data was committed to the database relative to other writes in the series of writes includes determining, using the order indicator, that confirmation of a preceding write has been received. The respective data of the preceding write was committed to the database immediately before the respective data of the respective write. In some of these implementations, determining that the confirmation of the preceding write has been received includes determining a level of a watermark of the first buffer. Optionally, sending the respective data from the second buffer to the first data streaming application based on the order the respective data was committed to the database relative to other writes in the series of writes includes determining, using the order indicator, that confirmation of a preceding write has not been received, the respective data of the preceding write committed to the database immediately before the respective data of the respective write and, after determining that the confirmation of the preceding write has not been received, receiving the confirmation that the respective data of the preceding write has been committed to the database. The operations may also include, in response to receiving the confirmation that the respective data of the preceding write has been committed to the database, sending the respective data of the preceding write from the second buffer to the second data streaming application and, after sending the respective data of the preceding write, sending the respective data of the respective write from the second buffer to the second data streaming application.

In some examples, the order indicator includes an incrementing identifier. The order indicator, in some implementations, includes a timestamp. In some of these implementations, the operations further include, generating, using the timestamp of each received confirmation, a linked list ordering the series of writes in an order the respective data of each respective write of the series of writes was committed to the database. Generating the linked list may include generating a hashmap.

Optionally, receiving, from the database, the confirmation that the respective data of the respective write has been committed to the database includes determining that a threshold period of time has passed without receiving the confirmation and, in response to determining that the threshold period of time has passed without receiving the confirmation, retrieving a changelog from the database. The operations may also further include determining, from the changelog, that the respective data of the respective write has been committed to the database. The database may include a Structured Query Language (SQL) database.

The details of one or more implementations of the disclosure are set forth in the accompanying drawings and the description below. Other aspects, features, and advantages will be apparent from the description and drawings, and from the claims.

DESCRIPTION OF DRAWINGS

FIGS. 3A-3C are schematic views of the database client of FIG. 2 receiving out of order write confirmations.

Like reference symbols in the various drawings indicate like elements.

DETAILED DESCRIPTION

Figure 1:
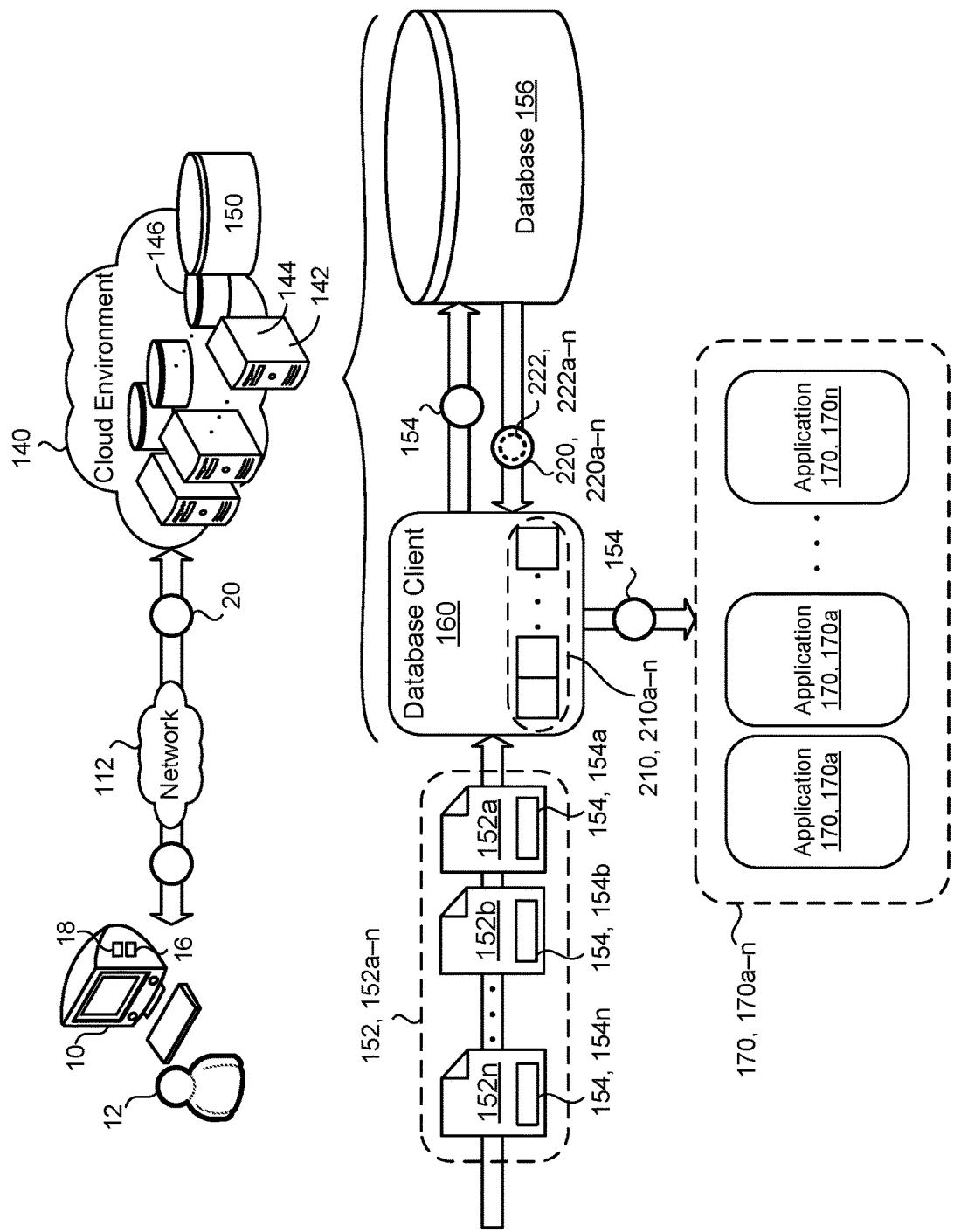
FIG. 1 is a schematic view of an example system for a low latency demultiplexer for propagating data to multiple sinks.

Large distributed databases (i.e., "cloud" databases) have continued to see increases in demand. With this increase in demand, it is not uncommon for a given database to have hundreds or thousands of data sinks that require any updates to the database in or near real time. For example, these data sinks require any data written to the database to be immediately streamed to the data sink with minimal latency. Generally speaking, these data sinks require data to be received in the same order that it was written or committed to the database. However, continuously propagating ordered data from a database to multiple sinks can be problematic when each sink consumes data at different rates.

A naive solution to this problem involves addressing data propagation to each sink individually. However, this requires a separate and independent database query for each stream of data to a given sink. Alternatively, each sink may be limited to the rate of the slowest sink, however this increases the latencies for all sinks except for the slowest sink. In yet another alternative, a system may retrieve database logs (e.g., write-ahead logging (WAL)) directly from the database to determine updates to the database, however this technique suffers from a number of drawbacks. First, the number of data streams is restricted to the number of connections that the database can sustain, which typically is no more than a few hundred. This lacks the scalability necessary to support modern distributed computing systems. Moreover, this technique also requires polling of the database, which consumes significant database resources at high polling frequencies and data latency at low polling frequencies.

Databases commonly include a database client that provides an interface between the database and users. The database client receives data (e.g., from one or more users) to write to the database. The database client provides the data to the database. Once the data is successfully written to the database (i.e., committed), the database provides commitment confirmation to the database client, which may in turn notify the user(s).

Implementations herein include a database client that executes at the application layer and mediates between a user and a database. The database client allows continuous propagation of ordered data in an efficient manner with minimal latency without the need for an additional storage system. Rather than execute along the read path of database logs, the database client executes along the write path of data to the database, allowing the database client to obtain written data without having to perform reads of the database. This allows the database client to forego serialization of data objects to and from a binary data format which is necessary for many databases (e.g., Structured Query Language (SQL) databases). The database client includes one or more buffer data structures that buffer data to be written to the database in transient or volatile memory. When the database client receives confirmation that the data has been committed to the database, the database client propagates the data from the buffer to each waiting data sink. Each data sink may receive data from a respective buffer at whatever rate the data sink is capable of handling. The database client may maintain a separate "watermark" or pointer to properly order data to each data sink individually.

Referring now to FIG. 1, in some implementations, an example data propagation system 100 includes a remote system 140 in communication with one or more user devices 10 via a network 112. The remote system 140 may be a single computer, multiple computers, or a distributed system (e.g., a cloud environment) having scalable/elastic resources 142 including computing resources 144 (e.g., data processing hardware) and/or storage resources 146 (e.g., memory hardware). A data store 150 (i.e., a remote storage device) may be overlain on the storage resources 146 to allow scalable use of the storage resources 146 by one or more of the clients (e.g., the user device 10) or the computing resources 144. The data store 150 is configured to store a set of data blocks 154, 154a-n (also referred to herein as just data 154) within one or more tables or databases 156 (i.e., a cloud database) that each include, for example, multiple rows and columns.

The remote system 140 is configured to receive a series of writes 152, 152a-n from a user device 10 associated with a respective user 12 via, for example, the network 112. The user device 10 may correspond to any computing device, such as a desktop workstation, a laptop workstation, or a mobile device (i.e., a smart phone). The user device 10 includes computing resources 18 (e.g., data processing hardware) and/or storage resources 16 (e.g., memory hardware). The user 12 may construct the query 20 using a SQL interface. Each write 152 in the series of writes 152 includes respective data 154 to be written to a database 156. The database 156 (e.g., an SQL database) may be stored on the data store 150.

The database client 160 mediates (e.g., on the application layer) communications between the user 12 and the database 156. The database client 160, in addition to interfacing with the database 156, propagates ordered data 154 to one or more applications 170, 170a-n (or any other data sink), such as one or more data streaming applications 170. Each application 170, once data 154 has been committed to the database 156, receives the ordered data 154 with minimal latency. That is, the applications 170 receive data 154 in the same order as the data 154 is written to the database 156.

For each write 152 in the series of writes 152 received by the database client 160, the database client 160 stores the data 154 of the write 152 in a buffer 210, 210a-n associated with each application 170 that the database client 160 streams data 154 to. For example, when the database client 160 streams data 154 to three applications 170, the database client 160 stores data 154 from each write 152 in a first buffer 210 associated with a first application 170, in a second buffer 210 associated with a second application 170, and in a third buffer 210 associated with a third application. In another example, the database client 160 stores data 154 from each write 152 in a single buffer 210 that is associated with all three applications 170. Each buffer 210 represents a data structure that uses transient storage (e.g., volatile memory) to temporarily store the data 154.

The database client 160, for each write 152, transmits the respective data 154 to the database 156. The database 156, for each write 152, stores or commits the respective data 154 to the database 156 (i.e., persistent or non-volatile storage) and then sends a confirmation 220, 220a-n to the database client 160 that confirms the data 154 has been committed to the database 156. Each confirmation 220 includes an order indicator 222 that indicates an order the data 154 of the respective write 152 was committed to the database 156 relative to the data 154 of other writes 152 in the series of writes 152. As discussed in more detail below, the order indicator 222 may include an incrementing identifier or a timestamp.

The database client 160, in response to receiving the confirmation 220 that data 154 of a write 154 has been committed to the database 156, sends the respective data 154 from each buffer 210 to the corresponding application 170. For example, a first buffer 210 sends data 154, once confirmed to be committed to the database 156, to a first application. In this example, the database client 160 sends the data 154, using a second buffer 210, to a second application 170. In this way, the database client 160 propagates the data 154 to the applications 170 with minimal latency by avoiding have to fetch or read the data 154 from the database 156 or from database logs. Instead, the database client 160 "intercepts" the data 154 on the way to the database 156 and stores the data 154 locally in the buffers 210 until the data 154 has been committed to the database 156. Once the database client 160 determines that the data 154 is committed to the database 156, the database client 160 may propagate the data 154, using the buffers 210, to the applications 170.

Figure 2:
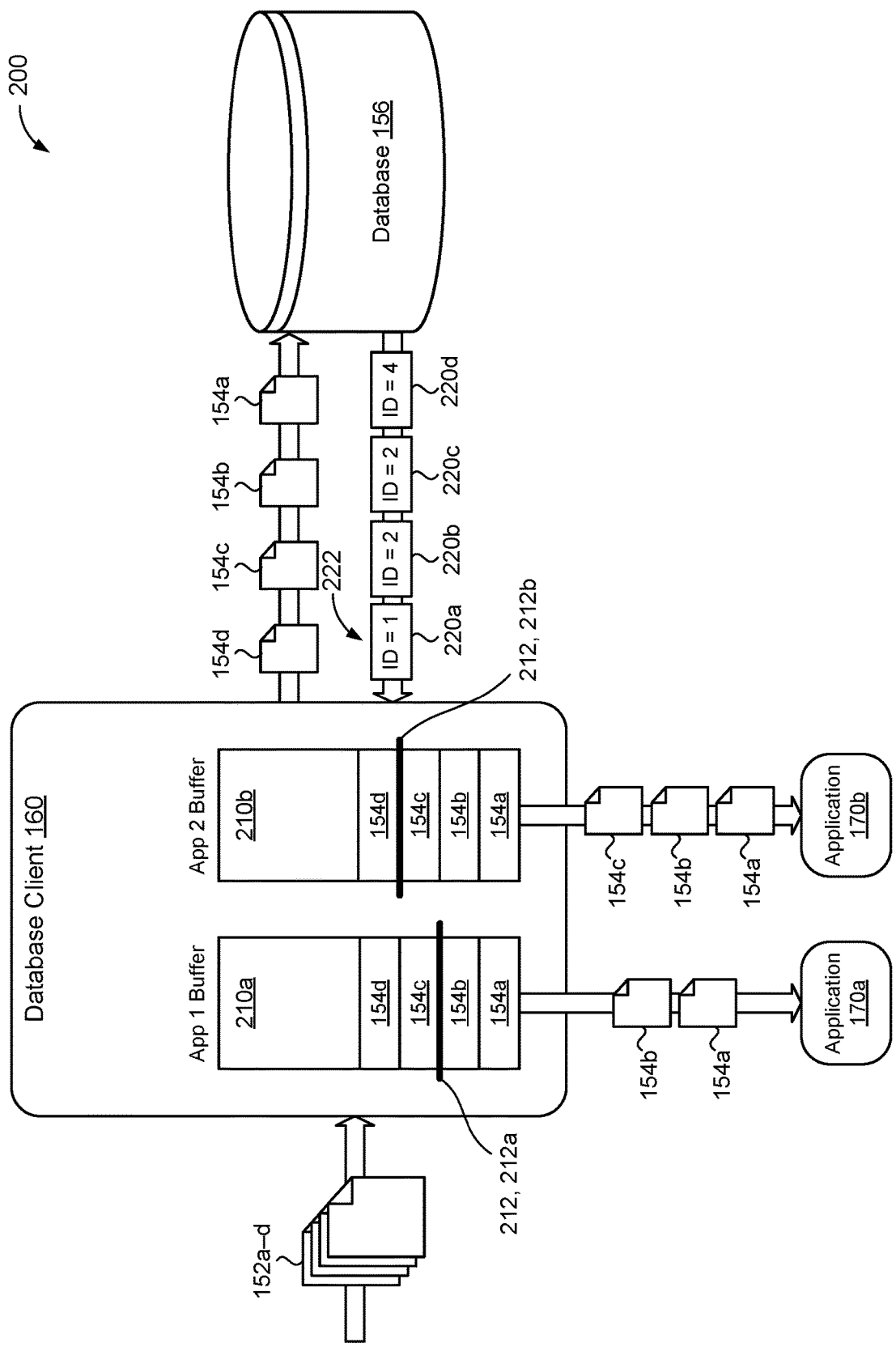
FIG. 2 is a schematic view of exemplary buffer data structures of a database client of the system of FIG. 1.

Referring now to FIG. 2, in some examples, the applications 170 (or any other data sinks) consume the data 154 at different rates. For example, one application 170 consumes data at an unrestricted rate (i.e., as fast as the database client 160 transmits the data 154) while another application 170 consumes data at a rate that is at least temporarily slower than the rate that the database client 160 can transmit the data 154 (i.e., slower than the rate the database 156 receives the data 154). In some implementations, the database client 160 implements a watermark 212, 212a-n for each buffer 210 that allows the database client 160 to track which data 154 has been transmitted to a respective application 170 and which data 154 has yet to be transmitted. When the database client 160 transmit new data 154 to an application 170, the database client 160 updates the corresponding watermark 212 to reflect the new position of the watermark 212 (i.e., to reflect that the new data 154 has been transmitted).

In some examples, the database client 160 expires (e.g., removes or deletes) data 154 from the buffers 210 based on the watermark 212. That is, when the watermark 212 indicates that the data 154 has been transmitted to the corresponding application 170, the database client 160 may recover the space in the buffer 210 by deleting or overwriting the sent data 154. In some implementations, multiple applications 170 share a single buffer 210. In these implementations, each application 170 that shares the buffer 210 has an independent watermark 212 to track which data 154 has been transmitted to which application 170. In this case, the database client 160 may ensure that data 154 is only expired when the data 154 has been transmitted to all applications 170 that use the buffer 210 (i.e., based on each of the independent watermarks 212).

In the example illustrated in schematic view 200, the database client 160 receives four writes 152a-d with data 154a-d to be written to the database 156. The database client 160 also streams the data 154 to two applications 170a-b. Each application 170 is associated with a corresponding buffer 210a-b. The database client 160, upon receiving the writes 154a-d, queues the data 154a-d in each of the buffers 210*a-b*. The database client 160 also transmits the data 154*a-d* to the database 156. In this example, the database 156 responds with four confirmations 220*a-d* (each including an order indicator 222) confirming that the data 154*a-d* has been committed. Here, the order indicator 222 is an incrementing identifier (i.e., an incrementing integer). That is, the database 156 increments the order indicator 222 for each successful commit to the database 156.

However, the first application 170*a* is only able to consume the data 154*a-b* (and not yet able to consume the data 154*c-d*) while the second application 170*b* is only able to consume the data 154*a-c* (and not yet able to consume the data 154*d*). Thus, the database client 160 updates the first watermark 212*a* to reflect that the database client 160 has transmitted the data 154*a-b* to the first application 170*a* and similarly updates the second watermark 212*b* to reflect that the database client 160 has transmitted the data 154*a-c* to the second application 170*b*. The unsent data 154 remains in the buffers 210 (i.e., data 154*c-d* in the first buffer 210*a* and the data 154*d* in the second buffer 210*b*) until the applications 170 indicate that the data 154 can be consumed or received. Thus, the database client 160 propagates the data 154 to different sinks (i.e., the applications 170) without relying on connections to the database 156 despite the sinks having different data consumption rates.

Figure 3A:
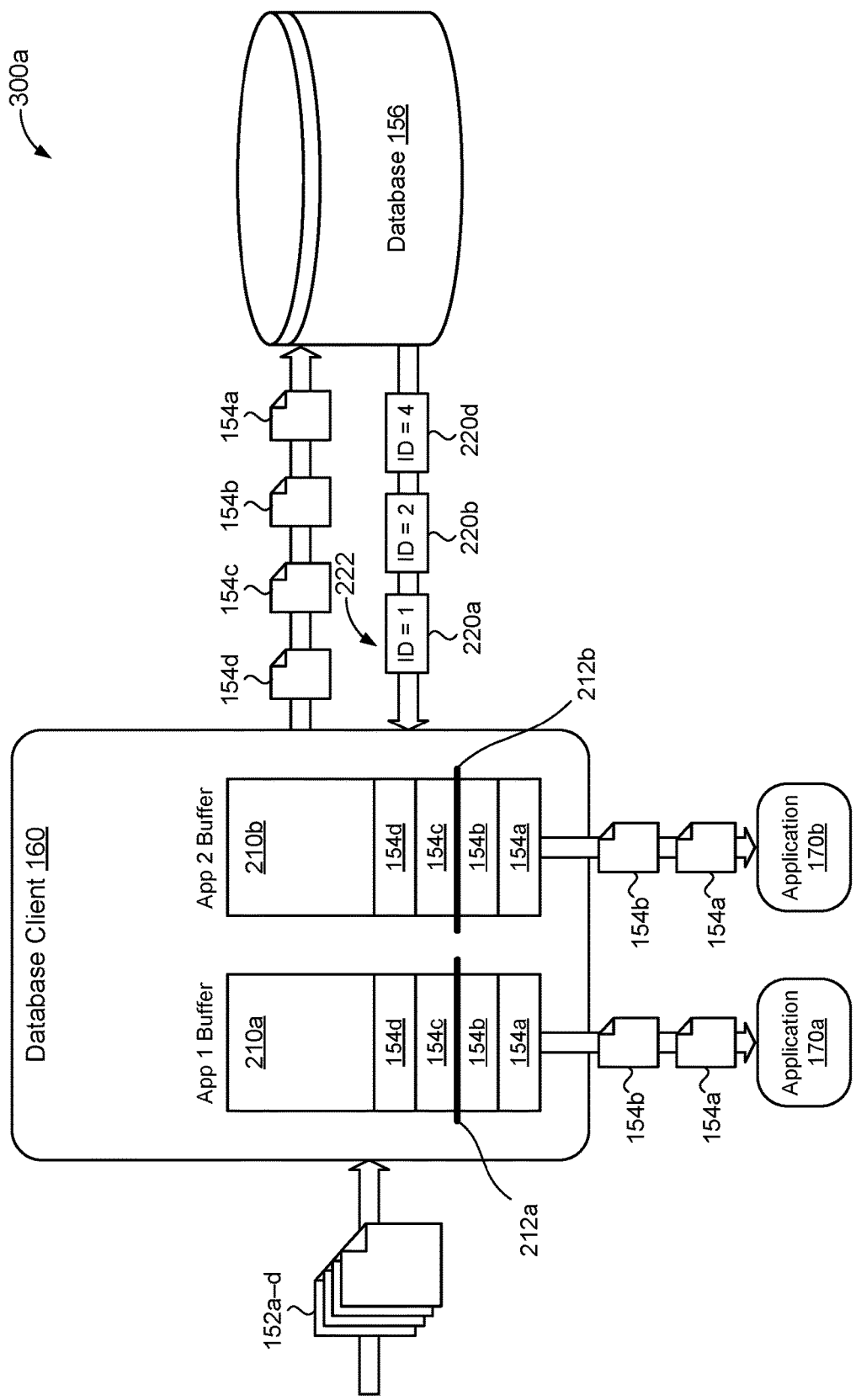

Referring now to FIG. 3A, in some implementations, when the database client 160 sends respective data 154 of a respective write 152 from a buffer 210 to an application 170 based on the order the respective data 154 was committed to the database 156 relative to other writes 152 sent by the database client 160 to the database 156, the database client 160 determines, using the order indicator 222, that confirmation 220 of a preceding write 152 has been received where the respective data 154 of the preceding write 152 committed to the database 156 immediately before the respective data 154 of the respective write 152. For example, the database client 160 determines that the confirmation 220 of the preceding write has been received by determining a level of the watermark 212 of the buffer 210.

For instance, as shown in schematic view 300*a*, the database client 160 receives four writes 152*a-d* and queues the corresponding data 154*a-d* in two buffers 210*a-b* for two applications 170*a-b*. The database client 160 transmits the data 154*a-d* to the database 156. In this example, the database client 160 receives confirmations 220*a,b,d* that the data 154*a,b,d* has been committed, but for an unknown reason (e.g., network congestion or failure) does not receive confirmation that the data 154*c* has been committed. In this scenario, the database client 160 transmits the data 154*a-b* from the first buffer 210*a* to the first application 170*a* and transmits the data 154*a-b* from the second buffer 210*b* to the second application 170*b*, as this reflects the order that the data 154 was committed to the database 156. However, the database client 160 does not transmit the data 154*d* to the applications 170*a-b* despite having receiving confirmation 220*d* that the data 154*d* is committed to the database 156 because the database client 160 determines (e.g., based on the order indicator 222) that there is data 154 that may have been committed prior to the data 154*d* that the database client 160 has not received confirmation for (i.e., the data 154*c*).

Figure 3B:
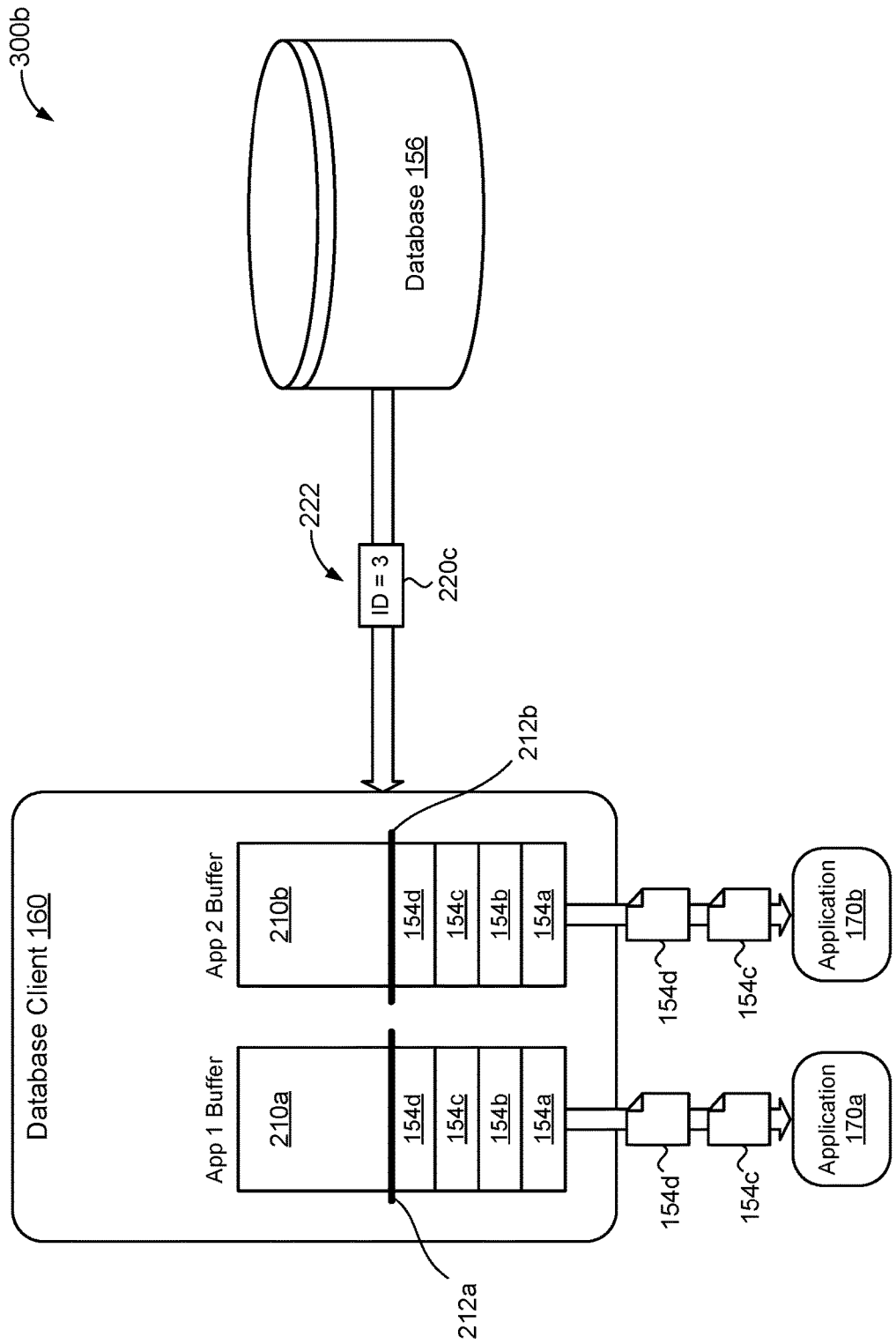

Referring now to FIG. 3B, the database client 160, in some implementations, waits for confirmation of the data 154*c* so that data 154 is propagated to the applications 170 in the proper order (i.e., the order that the database 156 committed the data 154). For example, the database client 160 determines, using the order indicator 222, that confirmation 220 of a preceding write 154 has not been received and, after determining that the confirmation 220 of the preceding write 154 has not been received, receives the confirmation 220 that the respective data 154 of the preceding write 152 has been committed to the database 156. In response to receiving the confirmation 220 that the respective data 154 of the preceding write 152 has been committed to the database 156, the database client 160 may send the respective data 154 of the preceding write 152 from a buffer 210 to a corresponding application 170. After sending the respective data 154 of the preceding write 152, the database client 160 may send the respective data 154 of the subsequent write 152 from the buffer 210 to the application 170.

For instance, continuing the example of FIG. 3A, after transmitting the data 154*a-b* to the applications 170*a-b*, the database client 160 receives confirmation 220*c* that the data 154*c* has been committed to the database 156. Thus, in this example, the data 154*a-d* is committed to the database 156 in a different order than the confirmations 220*a-d* are received by the database client 160. After receiving the confirmation 220*c*, the database client 160 transmits the remaining buffered data 154*c-d* from each buffer 210*a-b* to the corresponding application 170*a-b*. While in this example, the applications 170*a-b* consume data at the same rate, as discussed with regards to FIG. 2, the applications 170 may consume data at differing rates and the database client 160 relies on the buffers 210 to buffer the data 154 until all of the data 154 has been consumed by the applications 170.

Referring now to FIG. 3C and again continuing the example of FIG. 3A, the database client 160, in some implementations, fails to receive a missing confirmation 220*c* within a threshold period of time. In these implementations, the database client may include a fallback controller 310 that, after determining that the threshold period of time has been satisfied (e.g., at least 5 ms has elapsed), retrieves a changelog 330 from the database 156. For example, the fallback controller 310, in response to the threshold period of time being satisfied, transmits a changelog request 320 requesting the changelog 330. The fallback controller 310 may determine, from the changelog 330, that the respective data 154 has been committed to the database 156. In this example, the changelog 330 reveals that the data 154*c* has been committed to the database 156, and thus the database client 160 transmits the remaining buffered data 154*c-d* from each buffer 210*a-b* to the corresponding application 170*a-b*.

In the examples shown, the order indicator 222 is an incrementing identifier such as a monotonically increasing integer. Some databases 156 (e.g., SQL databases) use such a scheme with commitment confirmations. Such a scheme makes it straightforward for the database client 160 to determine which data 154 was committed to the database 156 immediately before a respective write 152 so that the data 154 can be properly ordered to the applications 170. For example, when the database client 160 receives a confirmation 220 of a first write 152 that includes an order identifier of "4," the database client 160 may determine with certainty that the data 154 associated with a confirmation 220 of a second write 152 that includes an order identifier of "3" was committed to the database 156 immediately before the first write 152 and thus the data 154 of the second write 152 should be propagated to the applications 170 prior to the data 154 of the first write 152. The database 156 need not commit data in order received from the database client 160. The database 156 may provide an indication (along with the order indicator 222) of which data 154 is committed with the confirmation 220 (e.g., using a description, identifier, a hash, etc.) to allow the database client 160 to match a confirmation 220 with specific data 154.

Some databases 156 may not include an incrementing identifier and instead include a timestamp as an order indicator 222. In this scenario, the database client 160 must determine an order to propagate the data 154 based on timestamps received in the confirmations 220. In some implementations, the database client 160 generates, using the timestamps, a linked list ordering the series of writes 152 in an order the respective data 154 of each respective write 152 was committed to the database 156. For example, the database client 160 generates a hashmap of data 154 which may be links to an ordered linked list. The database client 160 may insert the data 154 and/or writes 152 into the hashmap with a pointer to the immediately preceding write timestamp. By maintaining a pointer to the most recent data 154 propagated to the applications 170, the database client 160 buffers data 154 in the hashmap until the data 154 is ready to be propagated. In some examples, the database client 160 modifies a schema of the database 156 to aid in determining an order to the timestamps. For example, the modified schema may cause each write to update a field in a different row of the database with the exact same timestamp as the confirmation 220 timestamp. In this example, the database client 160 may perform a "stale read" of the modified row (e.g., at a point in time just before the timestamp) to determine the previous state of the row. Such stale reads tend to be very computationally cheap (i.e., much cheaper than pulling data from changelog tables directly).

While examples herein depict the buffer 210 storing the data 154 until the confirmation 220 of commitment is received, other buffers or storage locations may be used as well. For example, the data 154 may be stored initially in a first storage location (e.g., a first buffer) until the confirmation 220 is received. Upon receiving confirmation 220 that the data 154 is committed, the data 154 may be moved to the buffer 210, which may ease difficulties in purging data 154 that is not successfully committed. In this scenario, the data 154 is provided to the application 170 from the buffer 210 as quickly as the application 170 can consume the data 154, as all of the data 154 in the buffer 210 has already been committed.

Figure 4:
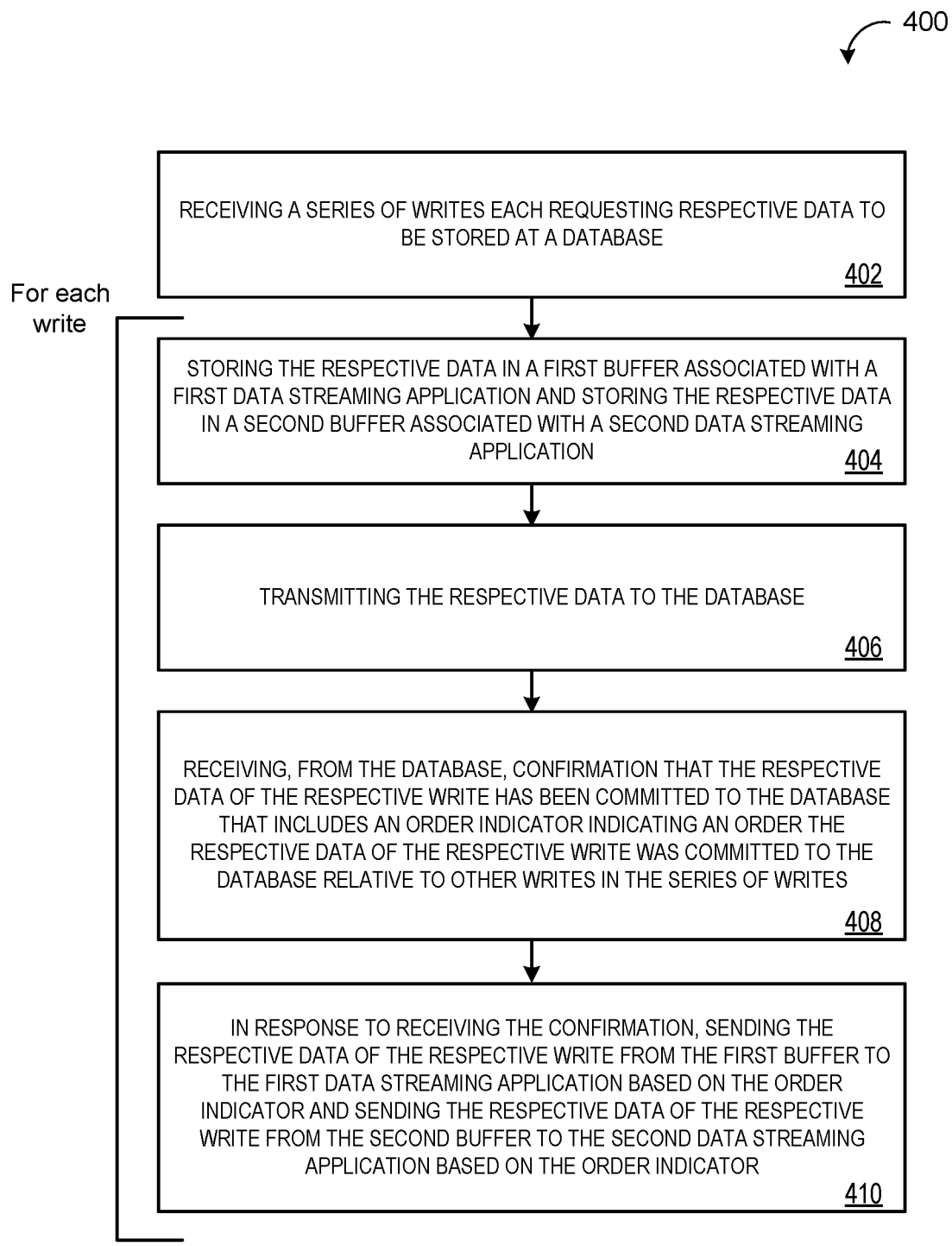
FIG. 4 a flowchart of an example arrangement of operations for a method of providing a low latency demultiplexer for propagating data to multiple sinks.

FIG. 4 is a flowchart of an exemplary arrangement of operations for a method 400 of providing a low latency demultiplexer for propagating data to multiple sinks. The computer-implemented method 400, when executed by data processing hardware 144, causes the data processing hardware 144 to perform operations. The method 400, at operation 402, includes receiving a series of writes 152 that each requests respective data 154 to be stored at a database 156 in communication with the data processing hardware 144. For each respective write 152 in the series of writes 152, the method 400, at operation 404, includes storing the respective data 154 in a first buffer 210 associated with a first data streaming application 170 and storing the respective data 154 in a second buffer 210 associated with a second data streaming application 170. At operation 406, the method 400 includes transmitting the respective data 154 to the database 156. The method 400, at operation 408, includes receiving, from the database 156, confirmation 220 that the respective data 154 of the respective write 152 has been committed to the database 156. The confirmation 220 includes an order indicator 222 indicating an order the respective data 154 of the respective write 152 was committed to the database 156 relative to other writes 152 in the series of writes 152. In response to receiving the confirmation 220 that the respective data 154 of the respective write 152 has been committed to the database 156, the method 400, at operation 410, includes sending the respective data 154 of the respective write 152 from the first buffer 210 to the first data streaming application 170 based on the order indicator 222 indicating the respective data 154 was committed to the database 156 relative to other writes 152 in the series of writes 152 and sending the respective data 154 of the respective write 152 from the second buffer 210 to the second data streaming application 170 based on the order indicator 222 indicating the respective data 154 was committed to the database 156 relative to other writes 152 in the series of writes 152.

Figure 5:
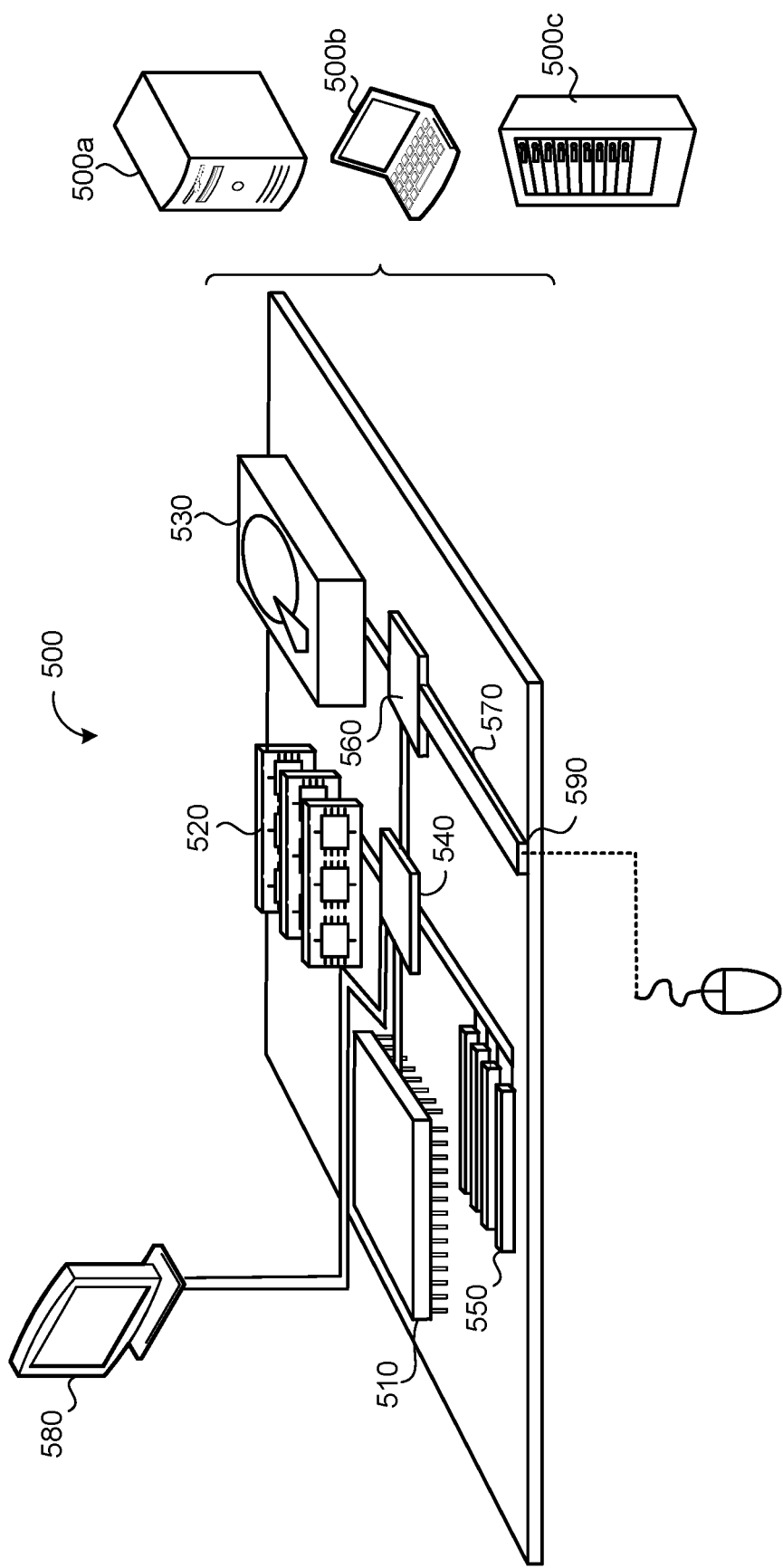
FIG. 5 is a schematic view of an example computing device that may be used to implement the systems and methods described herein.

FIG. 5 is a schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed by data processing hardware that causes the data processing hardware to perform operations comprising:
receiving a series of writes, each write in the series of writes requesting respective data to be stored at a database in communication with the data processing hardware; and
for each respective write in the series of writes:
storing the respective data in a first buffer associated with a first data streaming application;

storing the respective data in a second buffer associated with a second data streaming application;

transmitting the respective data to the database;

receiving, from the database, confirmation that the respective data of the respective write has been committed to the database, the confirmation comprising an order indicator indicating an order the respective data of the respective write was committed to the database relative to other writes in the series of writes; and in response to receiving the confirmation that the respective data of the respective write has been committed to the database:

sending the respective data of the respective write from the first buffer to the first data streaming application based on the order indicator indicating the respective data was committed to the database relative to other writes in the series of writes; and sending the respective data of the respective write from the second buffer to the second data streaming application based on the order indicator indicating the respective data was committed to the database relative to other writes in the series of writes.

2. The method of claim 1, wherein sending the respective data from the first buffer to the first data streaming application based on the order the respective data was committed to the database relative to other writes in the series of writes comprises determining, using the order indicator, that confirmation of a preceding write has been received, the respective data of the preceding write committed to the database immediately before the respective data of the respective write.

3. The method of claim 2, wherein determining that the confirmation of the preceding write has been received comprises determining a level of a watermark of the first buffer.

4. The method of claim 2, wherein sending the respective data from the second buffer to the first data streaming application based on the order the respective data was committed to the database relative to other writes in the series of writes comprises:

determining, using the order indicator, that confirmation of a preceding write has not been received, the respective data of the preceding write committed to the database immediately before the respective data of the respective write;

after determining that the confirmation of the preceding write has not been received, receiving the confirmation that the respective data of the preceding write has been committed to the database; and in response to receiving the confirmation that the respective data of the preceding write has been committed to the database:

sending the respective data of the preceding write from the second buffer to the second data streaming application; and after sending the respective data of the preceding write, sending the respective data of the respective write from the second buffer to the second data streaming application.

5. The method of claim 1, wherein the order indicator comprises an incrementing identifier.

6. The method of claim 1, wherein the order indicator comprises a timestamp.

7. The method of claim 6, wherein the operations further comprise, generating, using the timestamp of each received confirmation, a linked list ordering the series of writes in an order the respective data of each respective write of the series of writes was committed to the database.

8. The method of claim 7, wherein generating the linked list comprises generating a hashmap.

9. The method of claim 1, wherein receiving, from the database, the confirmation that the respective data of the respective write has been committed to the database comprises:

determining that a threshold period of time has passed without receiving the confirmation;

in response to determining that the threshold period of time has passed without receiving the confirmation, retrieving a changelog from the database; and determining, from the changelog, that the respective data of the respective write has been committed to the database.

10. The method of claim 1, wherein the database comprises a Structured Query Language (SQL) database.

11. A system comprising:

data processing hardware; and memory hardware in communication with the data processing hardware, the memory hardware storing instructions that when executed on the data processing hardware cause the data processing hardware to perform operations comprising:

receiving a series of writes, each write in the series of writes requesting respective data to be stored at a database in communication with the data processing hardware; and for each respective write in the series of writes:

storing the respective data in a first buffer associated with a first data streaming application;

storing the respective data in a second buffer associated with a second data streaming application;

transmitting the respective data to the database;

receiving, from the database, confirmation that the respective data of the respective write has been committed to the database, the confirmation comprising an order indicator indicating an order the respective data of the respective write was committed to the database relative to other writes in the series of writes; and in response to receiving the confirmation that the respective data of the respective write has been committed to the database:

sending the respective data of the respective write from the first buffer to the first data streaming application based on the order indicator indicating the respective data was committed to the database relative to other writes in the series of writes; and sending the respective data of the respective write from the second buffer to the second data streaming application based on the order indicator indicating the respective data was committed to the database relative to other writes in the series of writes.

12. The system of claim 11, wherein sending the respective data from the first buffer to the first data streaming application based on the order the respective data was committed to the database relative to other writes in the series of writes comprises determining, using the order indicator, that confirmation of a preceding write has been received, the respective data of the preceding write committed to the database immediately before the respective data of the respective write.

13. The system of claim 12, wherein determining that the confirmation of the preceding write has been received comprises determining a level of a watermark of the first buffer.

14. The system of claim 12, wherein sending the respective data from the second buffer to the first data streaming application based on the order the respective data was committed to the database relative to other writes in the series of writes comprises:
   determining, using the order indicator, that confirmation of a preceding write has not been received, the respective data of the preceding write committed to the database immediately before the respective data of the respective write;
   after determining that the confirmation of the preceding write has not been received, receiving the confirmation that the respective data of the preceding write has been committed to the database; and
   in response to receiving the confirmation that the respective data of the preceding write has been committed to the database:
      sending the respective data of the preceding write from the second buffer to the second data streaming application; and
      after sending the respective data of the preceding write, sending the respective data of the respective write from the second buffer to the second data streaming application.

15. The system of claim 11, wherein the order indicator comprises an incrementing identifier.

16. The system of claim 11, wherein the order indicator comprises a timestamp.

17. The system of claim 16, wherein the operations further comprise, generating, using the timestamp of each received confirmation, a linked list ordering the series of writes in an order the respective data of each respective write of the series of writes was committed to the database.

18. The system of claim 17, wherein generating the linked list comprises generating a hashmap.

19. The system of claim 11, wherein receiving, from the database, the confirmation that the respective data of the respective write has been committed to the database comprises:
   determining that a threshold period of time has passed without receiving the confirmation;
   in response to determining that the threshold period of time has passed without receiving the confirmation, retrieving a changelog from the database; and
   determining, from the changelog, that the respective data of the respective write has been committed to the database.

20. The system of claim 11, wherein the database comprises a Structured Query Language (SQL) database.

* * * * *